US006600979B1

(12) United States Patent
Kumar et al.

(10) Patent No.: US 6,600,979 B1
(45) Date of Patent: Jul. 29, 2003

(54) METHOD AND SYSTEM FOR DETERMINING AN INERTIALLY-ADJUSTED VEHICLE REFERENCE SPEED

(75) Inventors: Ajith K. Kumar, Erie, PA (US); Bret Dwayne Worden, Union City, PA (US); Roland Paul Donajkowski, Erie, PA (US)

(73) Assignee: General Electric Company

( * ) Notice: Subject to any disclaimer, the term of this patent is extended or adjusted under 35 U.S.C. 154(b) by 0 days.

(21) Appl. No.: 09/683,874

(22) Filed: Feb. 26, 2002

(51) Int. Cl.$^7$ .............................................. B60T 13/00
(52) U.S. Cl. ............................ 701/20; 701/1; 180/197
(58) Field of Search .............................. 701/20, 1, 74, 701/69; 180/197; 73/488, 489

(56) References Cited

U.S. PATENT DOCUMENTS

| | | | | |
|---|---|---|---|---|
| 4,872,116 A | * | 10/1989 | Ito et al. ..................... | 180/422 |
| 5,375,057 A | * | 12/1994 | Ackermann ................. | 180/408 |
| 6,028,402 A | | 2/2000 | Kumar et al. | |
| 6,208,097 B1 | * | 3/2001 | Reddy et al. ............... | 180/197 |
| 6,259,973 B1 | * | 7/2001 | Ehret et al. ................. | 180/197 |

* cited by examiner

Primary Examiner—William A. Cuchlinski, Jr.
Assistant Examiner—Olga Hernandez
(74) Attorney, Agent, or Firm—Carl Rowold, Esq.; Enrique J. Mora, Esq.; Beusse, Brownlee, Bowdoin & Wolter, P.A.

(57) ABSTRACT

Method and system for determining a reference speed indicative of true ground speed of a vehicle having a plurality of axles are provided. The reference speed for a designated one of the axles is dynamically adjusted to account for changes in vehicular acceleration that may occur while determination of the reference speed is being performed. The method allows collecting a stream of samples over respective sampling intervals of at least one motion-indication parameter corresponding to a respective axle of the vehicle. In one aspect thereof, one may use a torque reduction rulebase configured to avoid high torque reduction, and inaccuracies in the motion-indication parameter due to high levels of creep, if any, in a wheel of the respective axle. The method further allows estimating an inertia value for the vehicle based on respective changes in tractive effort and acceleration over each sampling interval. The collected motion parameter samples may be adjusted for changes in acceleration over each sampling interval using the estimated inertial value. A signal indicative of axle speed may be limited to at least one respective limit value of rate and magnitude based on the inertially-adjusted parameter samples to, for example, provide accurate slip control.

60 Claims, 7 Drawing Sheets

METHOD AND SYSTEM FOR DETERMINING AN INERTIALLY-ADJUSTED VEHICLE REFERENCE SPEED

BACKGROUND OF INVENTION

The present invention relates generally to method and system for determining reference speed in a vehicle, and, in particular, to method and system for determining a reference speed indicative of true ground speed in a locomotive driven by electric traction motors.

Locomotives used for various transportation applications are generally equipped with speed sensors connected to individual traction motors. Information from these speed sensors is compared with a reference speed (e.g., an estimate of the true ground speed) for obtaining the maximum adhesion and for wheel slip/slide protection. The estimate of ground speed, or reference speed, relies on individual motor speed sensors along with other ground speed measurements, such as radar-based ground speed measurements. The use of radar to estimate ground speed has disadvantages due to cost, poor accuracy and misoperation under some ground conditions and other environmental conditions. Accordingly, there is a need in the art for a technique for estimating ground speed which does not use radar.

U.S. patent application Ser. No. 09/842,554, filed on Apr. 26, 2001, commonly assigned to the assignee of the present invention and herein incorporated by reference, describes innovative system and techniques that advantageously allow elimininating radar measurements in order to determine the reference speed of the vehicle. The system and techniques of the above-identified patent application are particularly useful for relatively heavy-haul applications since vehicular acceleration is presumed to be relatively constant between samples. In passenger and relatively light-load haul applications, the assumption of having a constant acceleration between samples may not be valid. In view of the foregoing issues, it would be desirable to provide system and techniques not premised on having a relatively constant acceleration between samples, and, as a result, can be advantageously used for vehicles configured for light inertia applications.

SUMMARY OF INVENTION

Generally, the present invention fulfills the foregoing needs by providing in one aspect thereof, a method for determining a reference speed indicative of true ground speed of a vehicle having a plurality of axles. The reference speed for a designated one of the axles is dynamically adjusted to account for changes in vehicular acceleration that may occur while determination of the reference speed is being performed. The method allows collecting a stream of samples over respective sampling intervals of at least one motion-indication parameter corresponding to a respective axle using a torque reduction rulebase configured to avoid high torque reduction, and inaccuracies in the motion-indication parameter due to high levels of creep, if any, in a wheel of the respective axle. The method further allows estimating an inertia value for the vehicle based on respective changes in tractive effort and acceleration over each sampling interval. The collected motion parameter samples are adjusted for changes in acceleration over each sampling interval using the estimated inertial value. A signal indicative of axle speed is limited to at least one respective limit value of rate and magnitude based on the inertially-adjusted parameter samples. The limited signal indicative of axle speed comprises the reference speed for the designated axle.

The present invention further fulfills the foregoing needs by providing in another aspect thereof, a method for determining inertial estimates of a vehicle during dynamic operation thereof. The method allows collecting a stream of samples over respective sampling intervals of at least one motion-indication parameter corresponding to a respective axle of the vehicle. The method further allows estimating an inertia value for the vehicle based on respective changes in tractive effort and acceleration over each sampling interval.

In another aspect thereof, the present invention provides a method for controlling torque applied to an axle of a vehicle while performing sampling of motion-indication parameters of that axle. The method allows collecting a stream of samples over respective sampling intervals of at least one motion-indication parameter corresponding to a respective axle using a multi-stage torque reduction rulebase. The method further allows configuring the multi-stage torque reduction rulebase to avoid high torque reduction, and inaccuracies in the motion-indication parameter due to high levels of creep, if any, in a wheel of the respective axle.

In yet another aspect thereof, the present invention provides a method for using an inertial estimate of a vehicle for adjusting at least one parameter indicative of vehicle motion. The method allows collecting a stream of samples over respective sampling intervals of at least one motion-indication parameter corresponding to a respective axle of the vehicle. The method further allows estimating an inertia value for the vehicle, and adjusting the collected motion-indication parameter samples for changes in acceleration over each sampling interval based on the estimated inertial value of the vehicle.

In still another aspect thereof, the method provides a system for determining a reference speed indicative of true ground speed of a vehicle having a plurality of axles. The reference speed for a designated one of the axles is dynamically adjusted to account for changes in vehicular acceleration that may occur while determination of the reference speed is being performed. The system includes a module configured to collect a stream of samples over respective sampling intervals of at least one motion-indication parameter corresponding to a respective axle using a torque reduction rulebase configured to avoid high torque reduction, and inaccuracies in the motion-indication parameter due to high levels of creep, if any, in a wheel of the respective axle. The system further includes an inertia estimator configured to estimate an inertia value for the vehicle based on respective changes in tractive effort and acceleration over each sampling interval. A module is configured to adjust the collected motion parameter samples for changes in acceleration over each sampling interval using the estimated inertial value. A limiter configured to limit a signal indicative of axle speed to at least one respective limit value of rate and magnitude based on the inertially-adjusted parameter samples. The limited signal indicative of axle speed comprises the reference speed for the designated axle.

DETAILED DESCRIPTION

Figure 1:
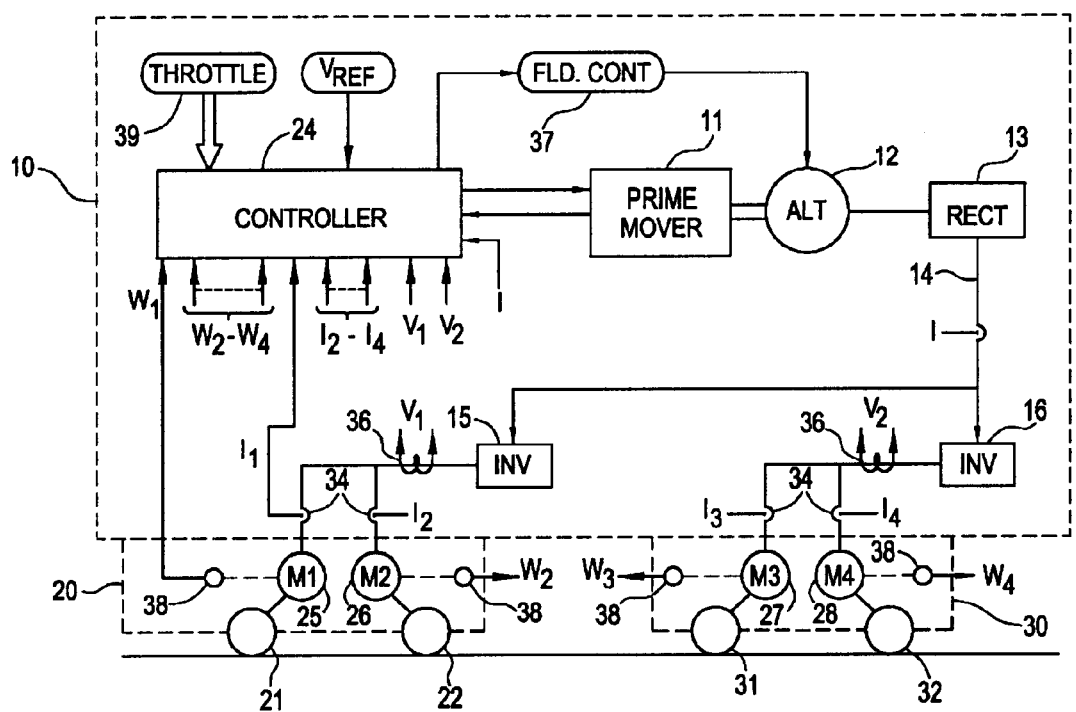
FIG. 1 is a simplified block diagram of an exemplary diesel electric locomotive.

The present invention may be broadly utilized in various types of electric motor powered vehicles, such as off-highway vehicles (earth moving machines), transit cars and locomotives. For purposes of illustration, the invention is described herein as it may be applied to a locomotive. An exemplary propulsion system 10 illustrated in FIG. 1 includes a variable speed prime mover 11 (e.g., a diesel engine) mechanically coupled to a rotor of a dynamo electric machine 12 comprising a 3-phase alternating current (AC) synchronous generator or alternator. The 3-phase voltages developed by alternator 12 are applied to respective AC input terminals of a conventional power rectifier bridge 13. The direct current (DC) output of bridge 13 is coupled via a DC link 14 to a number of controlled inverters, e.g., inverters 15 and 16, which invert the DC power to AC power at a selectable variable frequency. The inverters 15 and 16 are conventional inverters employing high power gate turn-off devices (GTOs) or other solid state devices, such as insulated-gate bipolar transistors (IGBTs), which switch in and out of conduction in response to gating signals from a system controller 24 to invert the DC voltage on DC link 14 to frequency-controlled AC voltage. The AC power is electrically coupled in energizing relationship to each of a plurality of adjustable speed AC traction motors, e.g., traction motors 25–28. Prime mover 11, alternator 12, rectifier bridge 13, and inverters 15 and 16 are mounted on a platform of the traction vehicle, illustrated as a 4-axle diesel-electric locomotive. The platform is in turn supported on two trucks 10 and 30, the first truck 20 having two axle-wheel sets 21 and 22 and the second truck 30 having two axle-wheel sets 31 and 32. It is understood that the number of axles may vary based on the requirements of any given application.

Each of the traction motors 25–28 is hung on a separate axle and its rotor is mechanically coupled, via conventional gearing, in driving relationship to an associated axle-wheel set. In the illustrative embodiment, the two motors 25 and 26 are electrically coupled in parallel with one another to receive power from inverter 15 while motors 27 and 28 are coupled to inverter 16. However, in some instances, it may be desirable to provide an inverter for each motor or to couple additional motors to a single inverter. As suggested above, the invention is not limited to 4-axle systems and is equally applicable to 6-axle locomotives with six inverters each connected for powering a respective one of six traction motors, each motor in turn connected to a respective one of the six axles. Suitable current transducers 34 and voltage transducers 36 are used to provide a suite of current and voltage feedback signals which are respectively representative of the magnitudes of current and voltage in the motor stators. Speed sensors 38 are used to provide speed signals representative of the rotational speeds W1–W4 in revolutions per minute (RPM) of the motor shafts. These speed signals are readily converted to wheel speed in a well-known manner. For simplicity of illustration, only single lines have been indicated for power flow although it will be apparent to those skilled in the art that motors 25–28 are typically three phase motors so that each power line represents three lines in such applications.

The magnitude of output voltage and current applied to rectifier bridge 13 is determined by the magnitude of excitation current supplied to the field windings of alternator 12 by field controller 37, which may be a conventional phase-controlled rectifier circuit since the alternator field generally requires DC excitation. The excitation current is set in response to an operator demand (e.g., via throttle 39) for vehicle speed by controller 24, which is in turn responsive to actual speed as represented by signals W1–W4. Controller 24 converts the throttle command to a corresponding torque request or command for use in controlling motors 25–28. Since AC motor torque is proportional to rotor current and air gap flux, these motor parameters may be monitored; or, more commonly, other parameters, such as applied voltage, stator current and motor RPM, may be used to reconstruct motor torque in controller 24. See, for example, U.S. Pat. No. 4,243,927. The controller 24 can adjust motor torque in response to throttle commands or in response to a program executed by the controller.

Figure 2:
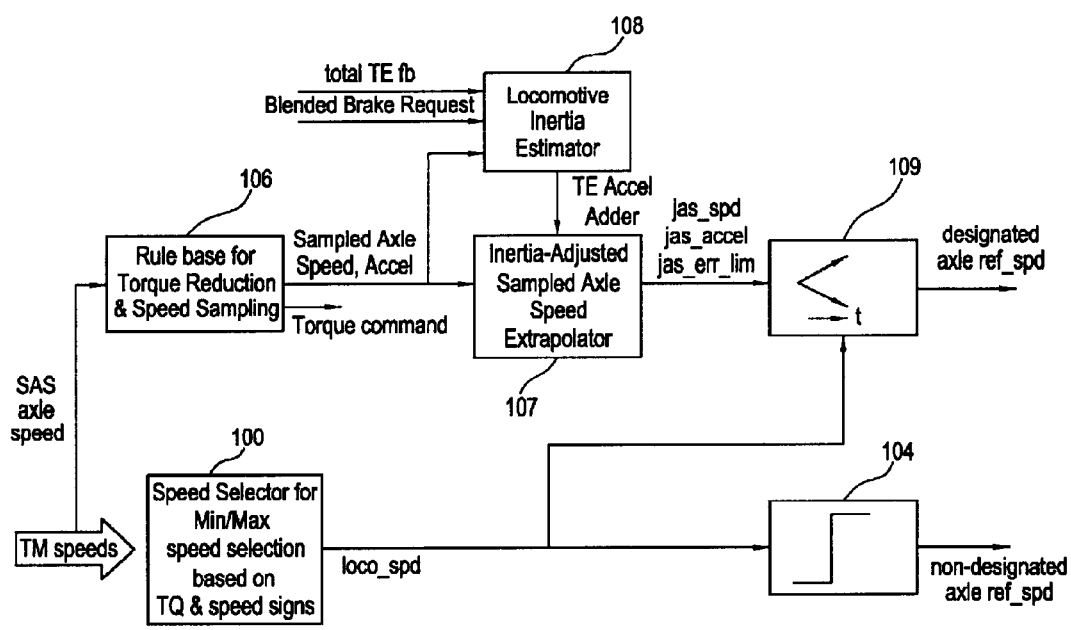
FIG. 2 is a block diagram of software processing modules that may be included in a controller that in response to instructions in a computer program stored in a suitable storage medium allow determining the reference speed of the vehicle in accordance with aspects of the present invention.

In one exemplary embodiment of the invention, controller 24 is configured to execute a program including software code for estimating true ground speed, also referred to as reference speed. FIG. 2 is a block diagram of software processing modules that may be included in controller 24 and that in response to instructions in a computer program stored in a suitable storage medium allow determining the reference speed of the vehicle. For the sake of avoiding tedious and repetitive explanation, one may assume a locomotive traveling in the forward direction and operating either in motoring or braking. It is understood, however, that the principles of the invention may be equally applied to locomotives traveling in an opposite direction by interchanging the polarity of appropriate operations and/or signals. Thus, the polarity of certain signals and operations may be reversed to reflect the direction of travel of the locomotive and/or the mode of operation of the locomotive. Further, the principles of the present invention may be extended to blended braking operation. That is, when the braking action includes both electric dynamic braking of the locomotive and fluidic-actuated (e.g., air-driven) frictional braking in the locomotive and the carts coupled to the locomotive, provided an indication of the braking request is used to estimate the total train braking tractive effort.

The exemplary embodiment of FIG. 2 assumes a locomotive having each inverter driving one motor. It will be understood, however, that the principles of the present invention may be applied to different configurations, such as those discussed in the context of FIG. 1. For purposes of ground speed determination, the controller may operate in at least two modes. That is, a normal mode and a backup mode, as described herein. In the normal mode, periodic speed sampling is performed on a respective axle appropriately synchronized with torque reductions for that axle. The speed samples are processed to develop an inertia estimate of the total train (e.g., locomotive/s and attached cars) to predict or inertially-adjust vehicle speed based on the inertia estimate. The inertially-adjusted speed is used to magnitude and rate limit an estimated reference speed for a conservatively controlled designated axle. The estimated reference speed used for all other axles (those axles not being the designated axle) is limited by relatively wide and generally constant respective magnitude and rate limits, which are based on physical limitations of the vehicle and nominal train application. These non-designated axles are controlled at relatively aggressive rates within the constraints of the vehicle and application (such as maximum vehicle jerk). The designated axle with a conservative inertia-based reference speed and conservative control provides synchronous slip protection. By way of comparison, the backup mode becomes active when the value of corrections for the predicted locomotive speed relative to actual speed samples becomes too large (e.g., larger than about 2 mph). In this backup mode, periodic speed sampling is also performed, with the caveat that no torque reductions are performed. The speed samples are used to maintain the inertia estimate and to predict locomotive speed.

However, in this mode, the inertially-adjusted locomotive speed is not used to estimate the reference speed for the designated axle.

As suggested above, controller 24 receives speed signals W1–W4 generated by speed sensors 38. The controller 24 then determines the axle having the minimum speed and selects the minimum speed using, a speed selector module 100 that provides a selected speed signal, (loco_spd). The selection of the minimum speed occurs periodically (e.g., every 20 ms) and thus the selected speed signal (loco_spd) may be derived from multiple axles. In a forward-motoring mode of travel, the minimum speed is used because in forward-motoring, the axle having the minimum speed would likely experience the least amount of slip and thus would be closest to the actual ground speed of the locomotive.

Conversely, if the locomotive is traveling in the forward direction, either in dynamic or blended braking mode, speed selector 100 would select the maximum speed. In dynamic braking, the locomotive is driving the motors (which may act as generators) and thus slip occurs in the opposite direction relative to wheel rotation. Thus, the maximum speed value likely has the least slip and would be closest to the ground speed. As will be readily appreciated by those skilled in the art, appropriate min/max selections of speed would be made when the locomotive is traveling in a rearward direction, depending on whether the locomotive is motoring or not.

As shown in FIG. 2, the selected speed signal (loco_spd) is then applied to a slew rate limiter 104 which applies predefined rate limits, such as an upper rate limit and a lower rate limit, to the selected speed to output a non-designated axle speed. In one exemplary embodiment, the output of limiter 104 comprises the reference speed for each axle of the locomotive, except one axle referred to as a designated axle. As described in greater detail below, the reference speed for the designated axle is more conservatively controlled to prevent slip conditions, which otherwise could detrimentally affect all axles. In one exemplary embodiment, the trailing axle is generally selected as the designated axle since the axle-wheels thereon often have the best adhesion to the rails because of surface cleaning inherently performed by the preceding axle-wheels. The limiter 104 prevents anomalous slew rates (e.g., high slew rate due to wheel slip) from contributing to the non-designated axle reference speed.

Figure 4:
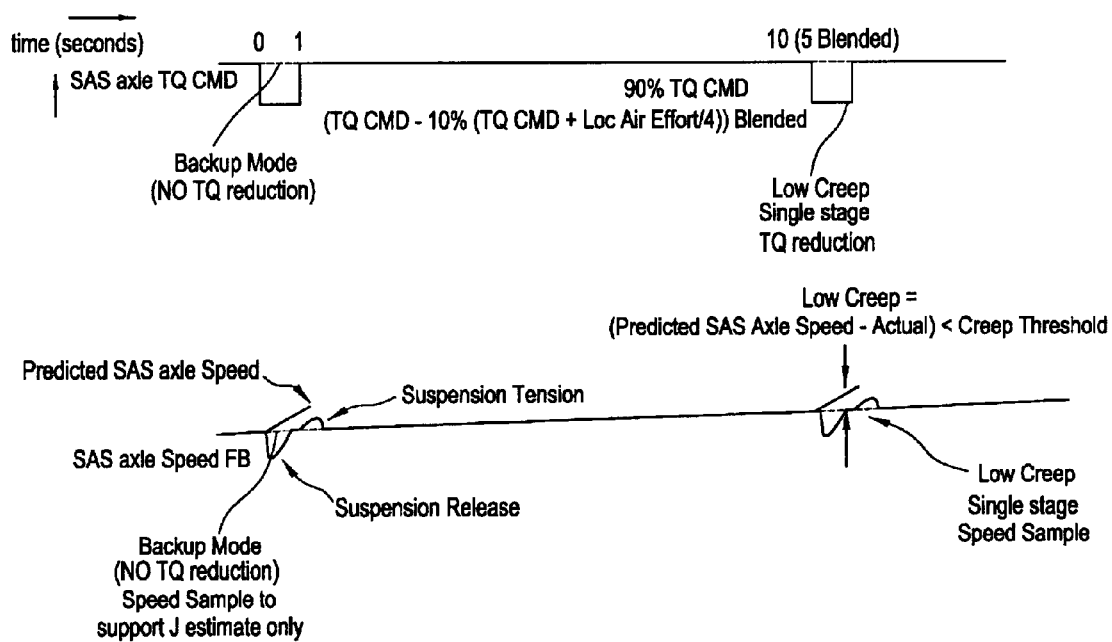
FIG. 4 illustrates exemplary waveforms, such as may correspond to respective torque reduction and speed sampling states during a first stage for determining the presence of high creep in a dual stage algorithm for performing torque reduction and collecting a speed sample.

FIG. 2 further illustrates a rulebase 106 for performing torque reduction and collecting a stream of samples over respective sampling intervals of at least one motion-indication parameter, such as speed or acceleration, corresponding to a respective axle. In the diagrams and explanation which follows, the respective axle selected for sampling is referred to as the SAS axle (Sampled Axle Speed axle). In one exemplary embodiment, rulebase 106 allows performing torque reduction and speed sampling in at least two stages. The first stage is used to detect the presence of creep. More specifically, the first stage allows for reducing torque level applied to the respective axle to a first torque value, (e.g., target value of about 90% of commanded torque prior to torque reduction) and determining whether or not the level of creep at that first torque value exceeds a creep threshold value. In the event the level of creep at the first torque value is below the creep threshold value, then rulebase 106 allows obtaining a respective sample for the at least one motion-indication parameter corresponding to the respective axle, e.g., a sample of axle speed. FIG. 4 illustrates exemplary waveforms, such as may correspond to respective torque reduction and speed sampling states during the first stage. As illustrated in FIG. 4, the speed sample is taken to avoid mechanical suspension effects that generally occur in response to changes in torque and which otherwise could introduce noise into the sample. FIG. 4 further illustrates that, during blended braking operation, an additional term indicative of locomotive air braking effort (designated as Loc Air Effort) is introduced to appropriately set the torque reduction target level to be applied based on the total (both air and dynamic) braking effort applied to each of the axles (e.g., 4 axles) of the locomotive.

Figure 5:
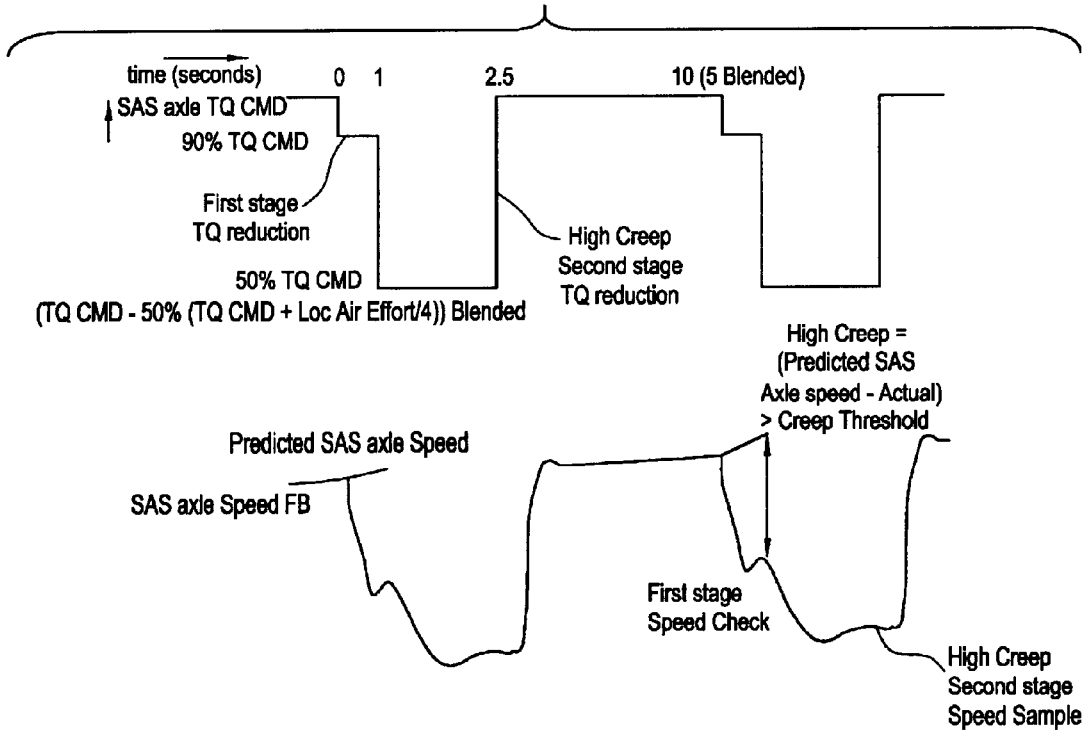
FIG. 5 illustrates exemplary waveforms, such as may correspond to torque reduction and speed sampling states when the first stage of FIG. 4 actually detects high creep, which is then extinguished during the second stage of the dual stage algorithm for performing torque reduction and collecting a speed sample.

The second stage is transitioned to extinguish creep, if the level of creep detected in the first stage exceeds a creep threshold value. More specifically, the second stage allows for reducing torque level applied to the respective axle to a second torque value lesser than the first torque value, (e.g., target value of about 50% of commanded torque prior to any torque reduction) and obtaining a respective sample for the at least one motion-indication parameter corresponding to the respective axle, e.g., axle speed. FIG. 5 illustrates exemplary waveforms, such as may correspond to torque reduction and speed sampling when the first stage does detect high creep, which is then extinguished during the second stage. This dual-stage technique is particularly useful in vehicles configured for relatively light-haulage applications by minimizing torque reduction used to obtain sampled speed. Under typical conditions, light-haulage applications are unlikely to be creeping so the small torque reduction provided during the first stage will normally be sufficient to support collection of a speed sample which reliably reflects true ground speed with sufficient accuracy. In one exemplary embodiment, use of a first stage with small torque reduction allows the speed sampling to be performed at higher frequency and thoughout the full application speed range, with minimal loss of acceleration and horse-power performance, which is desirable for light-haulage and passenger applications. Conversely, heavy-haulage applications are very likely to be creeping at low speeds and may use a single, large torque reduction to immediately extinguish this expected creep when taking a speed sample. Since maximum tractive effort is desirable in heavy-haulage applications (not necessarily acceleration) and reference speed accuracy is important for maximizing tractive effort, the higher torque reduction is generally acceptable when limited to lower speed ranges. Thus, it will be appreciated that rulebase 106 is configured to both avoid high torque reduction, and inaccuracies in the motion-indication parameter (e.g., axle speed) due to high levels of creep, if any, in the wheel-set of the respective axle being sampled. It will be further appreciated that the rulebase need not be limited to a dual stage rulebase for performing speed sampling/torque reduction since such rulebase could be extended to multiple creep detection stages or continuous (ramp-wise transition) torque reduction to detect creep in lieu of a step-wise transition.

In one exemplary embodiment, rulebase 106 is activated when the locomotive is providing power for motoring or braking. In one exemplary embodiment, the sampled axle speed comprises the axle selected to provide the loco_spd signal at the start of the torque reduction/speed sample cycle (such as may correspond to transition T1 below). As previously outlined in the description regarding the backup mode of operation, rulebase 106 would continue to cycle to collect speed samples and update vehicle inertia. However, in the backup mode only a single stage path is executed and no torque reduction is done. This is further detailed below.

Figure 3:
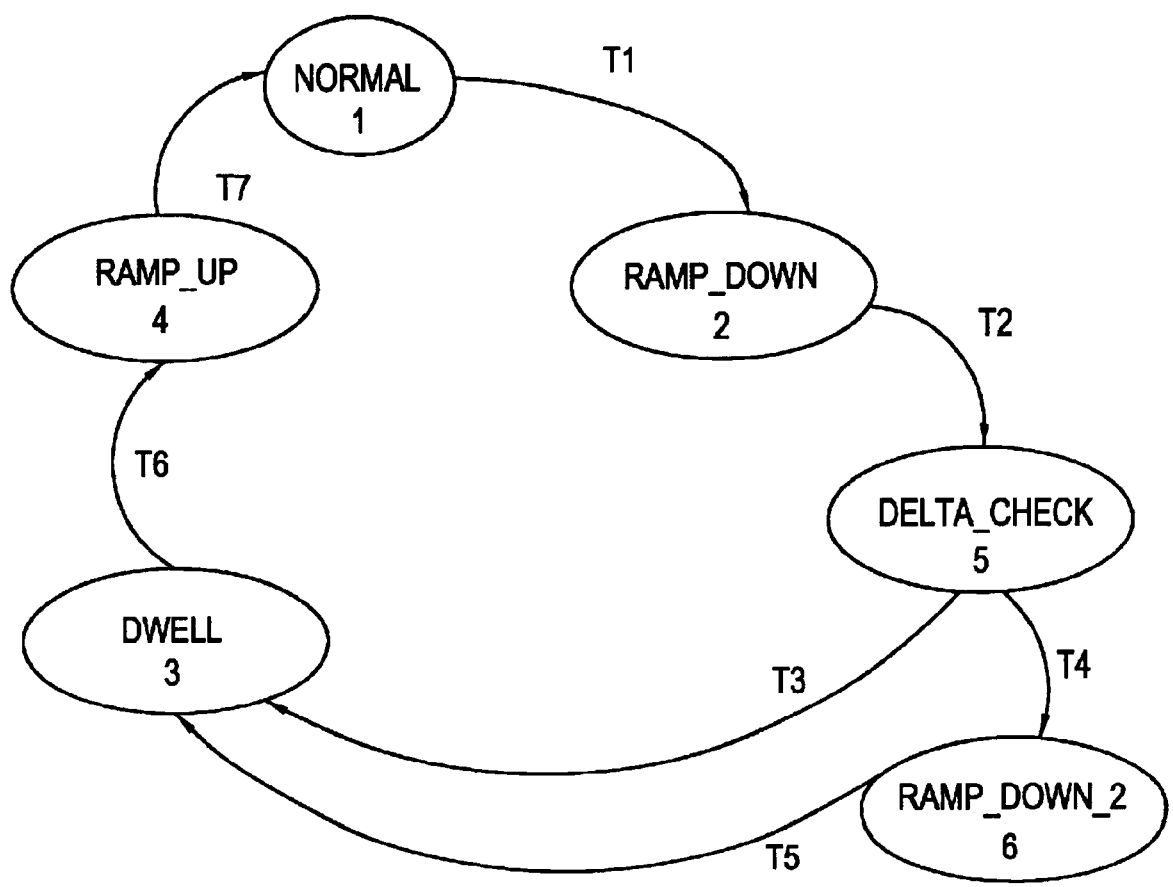
FIG. 3 is a state diagram for a rulebase depicting exemplary state transitions for performing torque reduction and collecting a stream of samples over respective sampling intervals of at least one motion-indication parameter, such as speed or acceleration, corresponding to a respective axle.

FIG. 3 illustrates a state diagram for rulebase 106 depicting the following exemplary state transitions:

Transition T1: Generally corresponds with duration of sampling intervals (e.g., every 10 seconds of time elapsed in motoring or in dynamic braking, or every 5 seconds of time elapsed in dynamic/friction blended braking).

Transition T2: Generally executed when the torque level is reduced sufficiently close to the first stage torque reduction target value (set during T1) that enables creep detection during the first stage (e.g., the torque command for the SAS axle (TQ CMD)) is reduced to 90% of its value at T1 in motoring normal mode, or 90% of combined electrical and friction brake TQ at T1 in braking normal mode, or no reduction in backup mode.

Transition T3: Generally executed when creep detection time during the first stage has expired (e.g., about 1.0 sec), and high levels of creep are not detected, (FIG. 4) or when the operating mode is the backup mode.

As suggested above, another possible outcome is that high creep is actually detected in the first stage. For example, when the absolute value of the difference between the present speed of the axle selected for sampling (SAS axle Speed FB (FIG. 4)) and its predicted speed (Predicted SAS axle Speed (FIG. 4)) exceeds the creep threshold value, (e.g., about 0.3 mph). The estimation of predicted sas_axle speed is based on an inertially-adjusted extrapolation for the sas_axle speed sampled at transition T1 before any torque reduction. The extrapolation is done using a sampled acceleration corresponding to the preceding sample and a TE Accel Adder adjustment, as described in greater detail below.

Transition T4: Generally executed when creep detection time during the first stage has expired (e.g., 1.0 sec) and high creep is detected (FIG. 5).

Transition T5: Generally executed when the torque level is reduced sufficiently close to the second target value that enables to extinguish any high creep detected during the first stage.

Transition T6: Generally executed when dwell time has expired (e.g., 0 seconds in the first stage, or 1.5 seconds in the event of dual stages).

Transition T7: Generally executed when torque value is sufficiently close to the level used in normal operation (e.g., no torque reduction).

Exemplary actions performed during the above-described state transitions may be as follows:

Transition T1: Allows selecting a respective axle for reducing torque and obtaining a sample of at least one motion-indication parameter corresponding to that respective axle, e.g., axle speed, or axle acceleration.

As suggested above, depending on the direction of travel of the vehicle and/or the mode of operation of the vehicle, the axle selected to be sampled may correspond either to the axle with current minimum or maximum speed, (in either case the objective is to select the axle speed with minimum creep). This axle is identified as the axle currently selected to provide loco_spd (selected by Speed Selector module 100 (FIG. 2)).

Allows setting the first target value for torque reduction (sas_trq_target) to detect high creep in the first stage. For example, in motoring or dynamic braking, the first target value is about 0.9* present value of the torque command for the selected axle.

Allows sampling axle speed before torque reduction.

Transition T2: Allows setting delta check timer to an appropriate value, e.g., 1.0 seconds.

Transition T3: Allows setting dwell timer to an appropriate value, e.g., 0 seconds for the first stage.

Transition T4: Allows setting the second target value for torque reduction (sas_trq_target) to extinguish creep during the second stage. For example, in motoring or dynamic braking, the second target value is 0.5* present value of the torque command on the selected axle.

Transition T5: Allows setting dwell timer to appropriate value, e.g., 1.5 seconds for dual stages.

Transition T6: Allows re-setting the target value of torque (sas_trq_target) to an unreduced level. Allows sampling axle speed after torque reduction, either during the first stage or the second stage (e.g. at the end of the respective dwell time).

Allows sampling axle speed after torque reduction, either during the first stage or the second stage (e.g., at the end of the respective dwell time).

Figure 6:
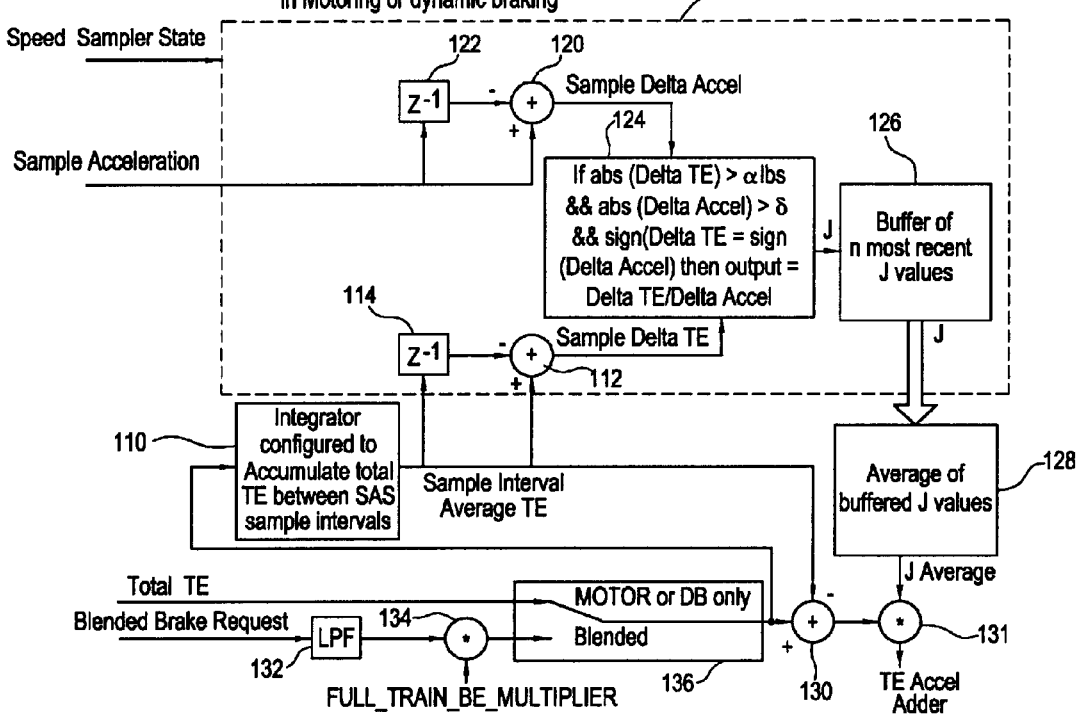
FIG. 6 illustrates a block diagram representation of an exemplary embodiment of an inertial estimator used for inertially adjusting speed and/or acceleration samples to reflect acceleration variation in the vehicle that may occur between respective sampling intervals.

As shown in FIG. 2, an inertial estimator 108 processes sampled axle speed sampled axle acceleration, and tractive effort to determine an average value of vehicle inertia. As each new speed sample is collected during motoring or dynamic braking operation, the change in tractive effort and the corresponding change in acceleration are evaluated for use in the inertia estimate based on Newton's second law, namely, delta_F=m*delta_a, with the understanding that mass is proportional to inertia. Between each speed sample, the tractive effort is integrated with a suitable integrator or accumulator 110 (FIG. 6). The integrator value at the time of each speed sample is saved (represented in FIG. 6 as Sample Internal Average TE or simply avg_te) and the integrator is reset after each speed sample is collected. As further illustrated in FIG. 6, the change in tractive effort (delta_F) is provided by a subtractor 112 that computes the difference between the present sample of integrated tractive effort (avg_te(n)) and the preceding sample of integrated tractive effort (avg_te(n−1)) provided by a delay unit 114. Similarly, the change in acceleration (delta_a) is provided by a subtractor 120 that computes the difference between the present sample of acceleration and the preceding sample of acceleration provided by a delay unit 122.

As shown in logic module 124, the inertia estimate is preferably updated for storage in a buffer memory 126 only when the respective polarity of the tractive effort and acceleration changes are the same (either both positive or both negative). Further, to reduce noise in the inertia estimate, the level of the respective tractive effort and acceleration changes should be above respective threshold levels (e.g., delta_F>2000 lbs and delta_a>0.1 mph). As suggested above, the inertia estimate is given by the ratio of delta_F/delta_a. To reduce any effects due to grade variation and/or noisy estimates, a number of estimates (e.g., 10) are averaged in a standard averaging module 128 to provide an average of the inertial estimate (J Average).

Between speed samples, the difference between the present tractive effort (supplied via a switching module 136) and the average tractive effort (avg_te value from integrator 110) corresponding to the previous speed sample interval, as calculated by a subtractor 130, is multiplied in a multiplier module 131 by the average inertia (J Average) estimation to provide an essentially continuous adjustment for use with the sampled acceleration, referred to as TE Accel Adder. This adjustment, as described above, is available during both motoring and braking operation. During blended braking, (locomotive & car friction braking and locomotive dynamic braking are combined), the braking request is filtered in a low-pass filter 132, to model air brake system lag, and adjusted using an externally-derived multiplier factor (FULL_TRAIN_BE_MULTIPLIER), to scale friction brake effectiveness, in a multiplier 134 to adjust the total train braking tractive effort to be used during blended braking, as passed to subtractor 130 through switching module 136. This multiplier factor includes an estimate of the number of cars in the train, which is based on the inertia estimate and nominal locomotive and car weights.

Figure 7:
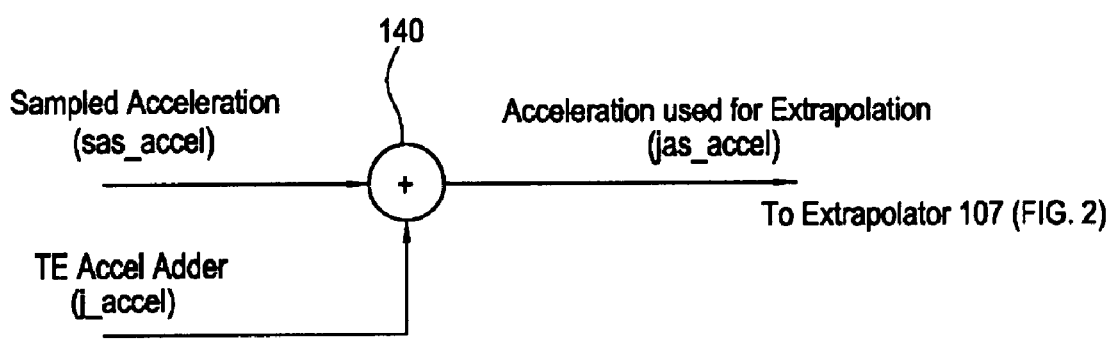
FIG. 7 is a block diagram of a summer that allows combining sampled axle acceleration and an adjustment, referred to as TE Accel Adder, based, at least in part, on the inertial estimate provided by the inertial estimator of FIG. 6 to provide an inertially-adjusted acceleration value, (jas_ accel).

As illustrated in FIG. 7, between respective speed samples, the sampled axle acceleration (sas_accel) and the TE Accel Adder (j_accel) are added in a summer 140 to provide an inertially-adjusted acceleration value, jas_accel. The inertially-adjusted acceleration value (jas_accel) parameter is used in an extrapolator 107 (FIG. 2) to extrapolate the value of sampled speed to provide a more precise speed estimate (jas_spd). That is, an estimate that compensates for variation in acceleration that may occur between each sample. Additionally, extrapolator 107 provides an uncertainty limit (jas_err_lim) to be associated with the inertially-adjusted speed. Jas_err_lim is set to 0 (no uncertainty) at the time of the speed sample update and in one exemplary embodiment increases at a fixed rate (jas_err_rate) during the extrapolation which occurs between samples. The rate of increase of jas_err_lim is set, for example, to allow up to the desired maximum estimate error at the end of the sample period (e.g., 2 mph uncertainty at the end of 10 seconds after speed sampling in motoring). A rate and magnitude limiter 109 is coupled to extrapolator 107 to receive the inertially-compensated parameters from extrapolator 107. The inertially-adjusted values (jas_spd and jas_accel) and the uncertainty limits (jas_err_rate and jas_err_lim) are used in limiter 109 to limit the value of loco_spd for use as the reference speed to the designated axle. As will be appreciated by those skilled in the art, the respective values of Jas_spd and jas_err_lim are used to magnitude limit loco_spd, and the values of jas_accel and jas_err_rate are respectively used to rate limit loco_spd. Thus, the output of limiter 109 providing designated axle reference speed is based on loco_spd bounded by sampled speed adjusted for inertia and a factor of uncertainty based on the age of the speed sample.

Limiter 109 allows limiting the magnitude of the selected locomotive speed (loco_spd) based on the inertially-adjusted extrapolated speed (jas_spd +/− jas_err_lim). As suggested above, the selected locomotive speed (loco_spd) is similarly rate limited using the inertia adjusted acceleration (jas_spd+/−jas_err_lim). As illustrated in FIG. 2, the output signal from limiter 109 comprises the reference speed for the designated axle.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, flash memories, EEPROM, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for determining a reference speed indicative of true ground speed of a vehicle having a plurality of axles, the reference speed for a designated one of the axles being dynamically adjusted to account for changes in vehicular acceleration that may occur while determination of the reference speed is being performed, the method comprising:

collecting a stream of samples over respective sampling intervals of at least one motion-indication parameter corresponding to a respective axle using a torque reduction rulebase configured to avoid high torque reduction, and inaccuracies in the motion-indication parameter due to high levels of creep, if any, in a wheel of the respective axle;

estimating an inertia value for the vehicle based on respective changes in tractive effort and acceleration over each sampling interval;

adjusting the collected motion parameter samples for changes in acceleration over each sampling interval using the estimated inertial value; and limiting a signal indicative of axle speed to at least one respective limit value of rate and magnitude based on the inertially-adjusted parameter samples, the limited signal indicative of axle speed comprising the reference speed for the designated axle.

2. The method of claim 1 wherein the at least one motion-indication parameter corresponding to the respective axle is selected from the group consisting of speed and acceleration.

3. The method of claim 1 wherein the torque reduction rulebase comprises a first stage for reducing torque level applied to the respective axle to a first torque value, and determining whether or not the level of creep at said first torque value exceeds a creep threshold value.

4. The method of claim 3 wherein, in the event the level of creep at said first torque value is below the creep threshold value, obtaining a respective sample for the at least one motion-indication parameter corresponding to the respective axle.

5. The method of claim 4 wherein, in the event the level of creep at said first torque value exceeds the creep threshold value, transitioning to a second stage for reducing torque level applied to the respective axle to a second torque value lesser than the first torque value, and obtaining a respective sample for the at least one motion-indication parameter corresponding to the respective axle.

6. The method of claim 5 wherein the transitioning to the second stage comprises a step-wise transitioning.

7. The method of claim 5 wherein the transitioning to the second stage comprises a ramp-wise transitioning.

8. The method of claim 1 wherein the estimating of the inertia value for the vehicle comprises accumulating tractive effort over a present sampling interval and further comprises calculating the difference in accumulated tractive effort between the present sampling interval and the preceding sampling interval, the calculated difference corresponding to changes in tractive effort over said sampling intervals.

9. The method of claim 8 wherein the estimating of the inertia value for the vehicle further comprises calculating the difference between an acceleration sample obtained in the present sampling interval and an acceleration sample obtained in the preceding sampling interval, the calculated difference corresponding to changes in acceleration over said sampling intervals.

10. The method of claim 9 wherein the estimating of the inertia value for the vehicle further comprises determining whether the calculated changes in tractive effort and acceleration meet respective threshold values and polarities.

11. The method of claim 10 wherein the estimating of the inertia value of the vehicle comprises calculating the ratio of the changes in tractive effort over the changes in acceleration.

12. The method of claim 10 wherein the estimating of the inertia value for the vehicle further comprises storing a value of the estimated inertial value based upon whether the calculated changes in tractive effort and acceleration meet the respective threshold values and polarities.

13. The method of claim 12 wherein the estimating of the inertia value for the vehicle further comprises calculating an average of a predefined number of the stored inertial values.

14. The method of claim 13 further comprising calculating the difference in tractive effort accumulated over a preceding sampling interval and a value of present tractive effort command, and multiplying the calculated difference with the calculated average of vehicle inertia to generate an adjustment to each corresponding axel acceleration sample.

15. The method of claim 14 further comprising generating an adjustment to each corresponding axle speed sample based on the generated adjustment to the respective acceleration sample.

16. A method for determining inertial estimates of a vehicle during dynamic operation thereof, the method comprising:
    collecting a stream of samples over respective sampling intervals of at least one motion-indication parameter corresponding to a respective axle of the vehicle; and
    estimating an inertia value for the vehicle based on respective changes in tractive effort and acceleration over each sampling interval, wherein the estimating of the inertial value for the vehicle comprises accumulating a signal indicative of tractive effort over a present sampling interval and further comprises calculating the difference in accumulated tractive effort between the present sampling interval and the preceding sampling interval, the calculated difference corresponding to changes in tractive effort over said sampling intervals.

17. The method of claim 16 wherein the estimating of the inertia value for the vehicle further comprises calculating the difference between an acceleration sample obtained in the present sampling interval and an acceleration sample obtained in the preceding sampling interval, the calculated difference corresponding to changes in acceleration over said sampling intervals.

18. The method of claim 17 wherein the estimating of the inertia value for the vehicle further comprises determining whether the calculated changes in tractive effort and acceleration meet respective threshold values and polarities.

19. The method of claim 18 wherein the estimating of the inertia value of the vehicle comprises calculating the ratio of the changes in tractive effort over the changes in acceleration.

20. The method of claim 18 wherein the estimating of the inertia value for the vehicle further comprises storing a value of the estimated inertial value based upon whether the calculated changes in tractive effort and acceleration meet the respective threshold values and polarities.

21. The method of claim 20 wherein the estimating of the inertia value for the vehicle further comprises calculating an average of a predefined number of the stored inertial values.

22. A method for controlling torque applied to an axle of a vehicle while performing sampling of motion-indication parameters of said axle, the method comprising:
    collecting a stream of samples over respective sampling intervals of at least one motion-indication parameter corresponding to a respective axle using a multi-stage torque reduction rulebase; and
    configuring the multi-stage torque reduction rulebase to avoid high torque reduction, and inaccuracies in the motion-indication parameter due to high levels of creep, if any, in a wheel of the respective axle.

23. The method of claim 22 wherein the at least one motion-indication parameter corresponding to the respective axle is selected from the group consisting of speed and acceleration.

24. The method of claim 22 wherein the multi-stage torque reduction rulebase comprises a first stage for reducing torque level applied to the respective axle to a first torque value, and determining whether or not the level of creep at said first torque value exceeds a creep threshold value.

25. The method of claim 24 wherein, in the event the level of creep at said first torque value is below the creep threshold value, obtaining a respective sample for the at least one motion-indication parameter corresponding to the respective axle.

26. The method of claim 25 wherein, in the event the level of creep at said first torque value exceeds the creep threshold value, transitioning to a second stage for reducing torque level applied to the respective axle to a second torque value lesser than the first torque value, and obtaining a respective sample for the at least one motion-indication parameter corresponding to the respective axle.

27. The method of claim 26 wherein the transitioning to the second stage comprises a step-wise transitioning.

28. The method of claim 26 wherein the transitioning to the second stage comprises a ramp-wise transitioning.

29. A method for using an inertial estimate of a vehicle for adjusting at least one parameter indicative of vehicle motion, the method comprising:
collecting a stream of samples over respective sampling intervals of at least one motion-indication parameter corresponding to a respective axle of the vehicle;
estimating an inertia value for the vehicle; and
adjusting the collected motion-indication parameter samples for changes in acceleration over each sampling interval based on the estimated inertial value of the vehicle to generate an adjustment to each corresponding axle acceleration sample.

30. The method of claim 29 further comprising limiting a signal indicative of axle speed to at least one respective limit value of rate and/or magnitude based on the inertially-adjusted parameter samples.

31. The method of claim 29 further comprising calculating the difference in tractive effort accumulated over a preceding sampling interval and a value of present tractive effort command, and multiplying the calculated difference with a calculated average of vehicle inertia to generate the adjustment to each corresponding axle acceleration sample.

32. The method of claim 31 further comprising generating an adjustment to each corresponding axle speed sample based on the generated adjustment to the respective acceleration sample.

33. The method of claim 29 wherein the inertially-adjusted parameter samples bound a signal indicative of ground speed of the vehicle.

34. The method of claim 29 wherein the inertially-adjusted parameter samples comprise a signal indicative of ground speed of the vehicle.

35. The method of claim 29 wherein the inertially-adjusted parameter samples allow determining creep detection in the respective axle of the vehicle.

36. The method of claim 29 wherein the vehicle comprises a train made up of a locomotive coupled to one or more cars and the inertially-adjusted parameter samples are used to make a determination of the number of cars hauled by the locomotive.

37. The method of claim 36 wherein the inertially-adjusted parameter samples are used to make an estimation of total blended braking effort for stopping the train.

38. A system for determining a reference speed indicative of true ground speed of a vehicle having a plurality of axles, the reference speed for a designated one of the axles being dynamically adjusted to account for changes in vehicular acceleration that may occur while determination of the reference speed is being performed, the system comprising:
a module configured to collect a stream of samples over respective sampling intervals of at least one motion-indication parameter corresponding to a respective axle using a torque reduction rulebase configured to avoid high torque reduction, and inaccuracies in the motion-indication parameter due to high levels of creep, if any, in a wheel of the respective axle;
an inertia estimator configured to estimate an inertia value for the vehicle based on respective changes in tractive effort and acceleration over each sampling interval;
a module configured to adjust the collected motion parameter samples for changes in acceleration over each sampling interval using the estimated inertial value; and
a limiter configured to limit a signal indicative of axle speed to at least one respective limit value of rate and magnitude based on the inertially-adjusted parameter samples, the limited signal indicative of axle speed comprising the reference speed for the designated axle.

39. The system of claim 38 wherein the at least one motion-indication parameter corresponding to the respective axle is selected from the group consisting of speed and acceleration.

40. The system of claim 38 wherein the torque reduction rulebase comprises a first stage for reducing torque level applied to the respective axle to a first torque value, and determining whether or not the level of creep at said first torque value exceeds a creep threshold value.

41. The system of claim 40 wherein, in the event the level of creep at said first torque value is below the creep threshold value, obtaining a respective sample for the at least one motion-indication parameter corresponding to the respective axle.

42. The system of claim 41 wherein, in the event the level of creep at said first torque value exceeds the creep threshold value, transitioning to a second stage for reducing torque level applied to the respective axle to a second torque value lesser than the first torque value, and obtaining a respective sample for the at least one motion-indication parameter corresponding to the respective axle.

43. The system of claim 42 wherein the transitioning to the second stage comprises a step-wise transitioning.

44. The system of claim 42 wherein the transitioning to the second stage comprises a ramp-wise transitioning.

45. The system of claim 38 wherein the inertia estimator comprises an integrator configured to integrate tractive effort over a present sampling interval and further comprises a subtractor for calculating the difference in accumulated tractive effort between the present sampling interval and the preceding sampling interval, the calculated difference corresponding to changes in tractive effort over said sampling intervals.

46. The system of claim 45 wherein the inertia estimator further comprises a subtractor for calculating the difference between an acceleration sample obtained in the present sampling interval and an acceleration sample obtained in the preceding sampling interval, the calculated difference corresponding to changes in acceleration over said sampling intervals.

47. The system of claim 46 wherein the inertia estimator further comprises logic for determining whether the calculated changes in tractive effort and acceleration meet respective threshold values and polarities.

48. The system of claim 47 wherein the inertia estimator comprises a module for calculating the ratio of the changes in tractive effort over the changes in acceleration.

49. The system of claim 48 wherein the inertia estimator comprises memory for storing a value of the estimated inertial value based upon whether the calculated changes in tractive effort and acceleration meet the respective threshold values and polarities.

50. The system of claim 49 wherein the inertia estimator further comprises an averaging module configured to calculate an average of a predefined number of the stored inertial values.

51. The system of claim 50 further comprising a subtractor configured to calculate the difference in tractive effort accumulated over a preceding sampling interval and a value of present tractive effort command, and a multiplier configured to multiply the calculated difference with the calculated average of vehicle inertia to generate an adjustment to each corresponding axel acceleration sample.

52. The system of claim 51 further comprising an extrapolator configured to generate an adjustment to each corresponding axle speed sample based on the generated adjustment to the respective acceleration sample.

53. A method for using an inertial estimate of a vehicle for adjusting at least one parameter indicative of vehicle motion, the method comprising:

collecting a stream of samples over respective sampling intervals of at least one motion-indication parameter corresponding to a respective axle of the vehicle;

estimating an inertia value for the vehicle;

adjusting the collected motion-indication parameter samples for changes in acceleration over each sampling interval based on the estimated inertial value of the vehicle; and limiting a signal indicative of axle speed to at least one respective limit value of rate and/or magnitude based on the inertially-adjusted parameter samples.

54. The method of claim 53 further comprising calculating the difference in tractive effort accumulated over a preceding sampling interval and a value of present tractive effort command, and multiplying the calculated difference with a calculated average of vehicle inertia to generate an adjustment to each corresponding axle acceleration sample.

55. The method of claim 54 further comprising generating an adjustment to each corresponding axle speed sample based on the generated adjustment to the respective acceleration sample.

56. The method of claim 53 wherein the inertially-adjusted parameter samples bound a signal indicative of ground speed of the vehicle.

57. The method of claim 53 wherein the inertially-adjusted parameter samples comprise a signal indicative of ground speed of the vehicle.

58. The method of claim 53 wherein the inertially-adjusted parameter samples allow determining creep detection in the respective axle of the vehicle.

59. The method of claim 53 wherein the vehicle comprises a train made up of a locomotive coupled to one or more cars and the inertially-adjusted parameter samples are used to make a determination of the number of cars hauled by the locomotive.

60. The method of claim 59 wherein the inertially-adjusted parameter samples are used to make an estimation of total blended braking effort for stopping the train.

\* \* \* \* \*